Figure 1:
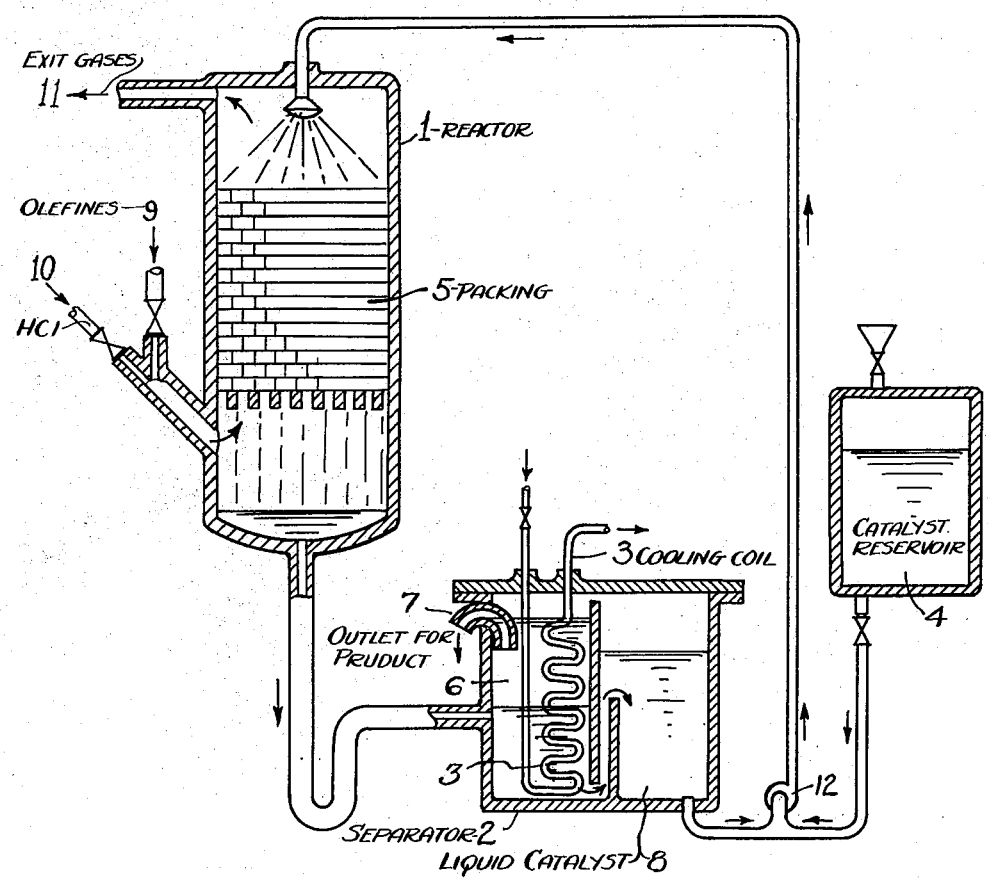

Patented Dec. 25, 1934

1,985,457

UNITED STATES PATENT OFFICE

1,985,457

SEPARATION OF ETHYLENE AND PREPARATION OF ALKYL HALIDES FROM OLEFINE MIXTURES

Howard S. Nutting, Peter S. Petrie, Donald H. Croope, and Myron E. Huscher, Midland, Mich., assignors to The Dow Chemical Company, Midland, Mich., a corporation of Michigan Application October 30, 1931, Serial No. 571,964

32 Claims. (Cl. 260—162)

The present invention concerns a new process whereby: a mixture of olefines may be treated with a hydrogen halide in the presence of a liquid catalyst to form, preferentially, one or more alkyl halides or a series of alkyl halides from various components of said mixture in the order of their relative reactivities; each alkyl halide may be separated from the reaction mixture substantially as it is formed; ethylene may be separated from its homologues as such, or it may be converted into ethyl halide during operation of said process; and the liquid catalyst employed may be purified continuously during operation of the process.

It is known that a gaseous olefine, such as ethylene or propylene, may be intermixed with hydrogen halide and passed over a compound of a metal of the fifth group of the periodic system, as catalyst, to form the corresponding alkyl halide. Wibaut, in U. S. Patent 1,591,151, describes a process whereby either ethylene or propylene may be passed over such catalyst, supported on a solid porous base such as asbestos, pumice, etc., at a temperature below 250° C. to form ethyl chloride or propyl chloride, respectively. Wibaut notes the fact that under such conditions propylene reacts more readily and at a lower temperature than does ethylene. In the aforementioned patent, it is stated that ethylene may be converted into ethyl chloride more readily and at lower temperatures when bismuth compounds are employed as catalysts than when the corresponding antimony compounds are so employed.

In spite of the fact that the above mentioned reaction is known to proceed more readily and at a lower temperature with propylene than with ethylene, no attempt has been made to employ such reaction in a process for the separation of a mixture of olefines. Davis, in U. S. Patent 1,790,519, does describe a process whereby olefines having a tertiary base structure, e. g. isobutylene, trimethyl ethylene, etc., are separated from secondary base olefines such as ethylene, propylene, etc., through subjecting a mixture of such compounds to the action of a concentrated hydrohalogen acid, at about or below room temperature and under either atmospheric or super-atmospheric pressure. According to the description in said patent, tertiary base olefines add hydrogen halide readily under the conditions described, whereas secondary base olefines remain substantially unreacted and may be distilled readily from the tertiary base alkyl halides formed. The method described by Davis provides a means for separating two distinct types of olefines having widely different activities with respect to their property of combining with a hydrogen halide. Said method does not, however, provide a means for separating the simple, homologous olefines, such as ethylene, propylene, butylene, etc., one from another nor does it provide a means for reacting the ingredients of such a mixture so as to form the corresponding alkyl halides selectively.

We have now found:—

(a) that an olefine may be reacted with a hydrogen halide, in the presence of a liquid catalyst comprising a compound of a metal belonging to the fifth group of the periodic system, to form the corresponding alkyl halide;

(b) that when a reaction mixture comprising two or more gaseous olefines and a hydrogen halide is in contact with such liquid catalyst under suitable reaction conditions, the more reactive olefine or olefines may be converted to the corresponding alkyl halide or halides and the less reactive olefine or olefines may be withdrawn from the liquid catalyst and separated from the alkyl halide or halides, substantially, as unreacted material;

(c) that a gaseous mixture comprising two or more olefines may be contacted in succession with a series of liquid catalysts and various components of said olefinic mixture may be reacted (separately, and in the order of their decreasing reactivities) with hydrogen halide in the presence of the different members of said series of catalysts, each liquid catalyst being of composition, concentration and temperature so adjusted as to cause substantially only the most reactive of the mixed olefines to be so converted to an alkyl halide, i. e. a different alkyl halide may be formed in the presence of each member of the series of liquid catalysts;

(d) that when a gaseous mixture of olefines is treated in the manner described in (c), each alkyl halide may be separated from the olefinic mixture substantially as it is formed;

(e) that the procedure involved in accomplishing the above mentioned results may be varied considerably; a gaseous mixture comprising hydrogen halide and olefines may be contacted with a liquid catalyst or the hydrogen halide and olefines may be brought into contact with each other in the presence of the liquid catalyst itself; and (f) that the liquid catalyst so employed may be purified continuously during operation, whereby a continuous process may be maintained.

To the accomplishment of the foregoing and related ends, the invention, then consists of the method hereinafter fully described and particularly pointed out in the claims, the annexed drawing and the following description setting forth in detail several modes of carrying out the invention, such disclosed modes illustrating, however, but several of the various ways in which the principle of the invention may be used.

The present invention is particularly adapted to the separation of ethylene from admixture with its homologues, either in the form of ethylene itself or as ethyl halide, and to the simultaneous formation of alkyl halides from the other olefines present. When a gaseous mixture comprising hydrogen halide and the more reactive olefines, such as the butylenes, amylenes, hexylenes, etc., is passed, at reaction temperature, over a solid catalyst comprising a compound of a metal of the fifth group of the periodic system (i. e. a catalyst such as that described by Wibaut, United States Patent 1,591,151), the more reactive olefines polymerize to a considerable extent and form a coating over the solid catalyst, thereby inhibiting a continuation of the process. We have found, however, that a reaction mixture containing hydrogen halide, ethylene and said more reactive olefines, may be contacted with a liquid catalyst, containing a compound of a metal selected from the fifth group of the periodic system, to form alkyl halides from the more reactive olefines and that olefinic polymers of the latter, if formed, do not coagulate the catalyst or in any way prevent continuation of the process. By so employing such liquid catalyst, we are enabled to obtain more complete contact between the catalyst and the reactants than is attainable through employment of a solid catalyst or a fused catalyst supported on a solid base. The employment of a liquid catalyst is further advantageous over similar employment of a solid or supported catalyst in that when the latter type of catalyst is used to promote the addition of hydrogen halide to an olefine, temperature control is difficult and local over-heating with resultant polymerization of the olefinic reactants is liable to occur. When a liquid catalyst is used, however, the temperature of the same may be controlled readily by means of a cooling or heating coil inserted within the same, by continually circulating said liquid catalyst through a cooling or heating apparatus, as desired, or by any other suitable means. As a liquid catalyst we prefer to employ a halide of a metal from the fifth group of the periodic system in concentration which may vary from the molten compound itself to a relatively dilute solution of said compound in a solvent capable of dissolving the same. Antimony trichloride, for instance, may be employed as a solution of said compound in any of a vast number of solvents, e. g. concentrated hydrochloric acid, acetic acid, monochloro-benzene, ortho-dichloro-benzene, acetophenone, alpha-chloro-naphthalene, etc. Bismuth trichloride, on the other hand, is more limited in solubility but may be employed as a solution of the same in various solvents, among which may be mentioned concentrated hydrochloric acid and glacial acetic acid.

The three most important factors governing the activity of our liquid catalyst are:—the composition of the catalyst itself, the concentration of the catalytic solution employed, and the temperature at which said liquid catalyst is used. In contrast to the statement by Wibaut, U. S. Patent 1,591,151, to the effect that solid bismuth compounds are more active as catalysts at low temperatures than are the corresponding solid antimony compounds, we have found that an antimony trihalide, when employed in a liquid catalyst, is far more active than is the corresponding bismuth compound when used under similar conditions. For instance, propylene, intermixed with slightly more than its molecular equivalent of hydrogen chloride, is converted readily into isopropyl chloride by passing said gaseous mixture into an 85 per cent solution of antimony trichloride in concentrated hydrochloric acid at 25° C. A mixture of propylene and slightly more than its molecular equivalent of hydrogen chloride may be passed through an 85 per cent solution of bismuth trichloride in concentrated hydrochloric acid, at approximately the same rate as when the aforementioned test was made using antimony trichloride as a catalyst and at a temperature as high as 65° C., without an appreciable conversion to isopropyl chloride being effected. As might be expected, an increase in the concentration of a liquid catalyst or in the temperature at which said catalyst is employed, increases the speed of reaction between an olefine and hydrogen halide when such reaction occurs in the presence of said liquid catalyst. The activity of our liquid catalyst is then, controllable through varying any of the three factors mentioned, i. e. composition of the catalyst itself, concentration of the same, and temperature at which said catalyst is employed.

In employing the principle of our invention to form selectively a series of alkyl halides from a mixture of olefines, we prefer to contact a gaseous mixture of such olefines with slightly more than their combined molecular equivalent of hydrogen halide with a liquid catalyst flowing in a direction opposite to the flow of the gaseous mixture, said liquid catalyst being of activity so adjusted that only, or substantially only, the most active olefine present is converted into the corresponding alkyl halide. The alkyl halide so formed may be swept from the aforementioned catalyst along with the unreacted olefines but is preferably retained in the catalyst and subsequently separated therefrom according to procedure described later in this application. The unreacted olefines and hydrogen halide which pass through the first reaction chamber are next conducted preferably countercurrent to a liquid catalyst under conditions of greater activity than that in the previous catalytic reaction, whereby the olefine (or olefines) having greatest activity, of all olefines which passed the first mentioned catalyst unreacted, is (are) in its (their) turn converted to the corresponding alkyl halide (halides) and separated as such. By passing an olefinic mixture and hydrogen halide through a series of catalysts of, or under conditions of, successively increasing activity we are enabled to separate the ethylene, substantially free from homologous compounds, or we may continue the process so as to produce an ethyl halide in substantially pure form. While the intermediate alkyl halides, such as isopropyl halide, secondary butyl halide, etc., are not always so separated from the process in pure form, yet they may be separated therefrom in fractions containing more than 50 per cent by weight, of a single alkyl halide, which halide may subsequently be purified in any of the usual ways (e. g. through fractional distillation, etc.).

As alternative procedure, the gaseous mixture of ethylene and other olefines may be reacted with hydrogen halide in the presence of a liquid catalyst of sufficient activity to promote the simultaneous conversion of all olefines except ethylene to their corresponding alkyl halides. The ethylene may thus be separated in a form substantially free of contamination by homologous compounds and the mixed alkyl halides may be separated through fractional distillation. However, the higher gaseous olefines, such as butylene, amylene, etc. tend to polymerize readily in the presence of a highly active catalyst, but react smoothly to form a alkyl halides when contacted with a relatively inactive liquid catalyst. The practice of contacting the reaction mixture successively with a series of liquid catalysts of successively increasing activities is therefore, advantageous, not only in that a partial separation of the alkyl halide products is thereby effected, but in that the loss of material through polymerization, and the resultant contamination of the liquid catalyst, is thereby largely avoided.

Several alternative modes of procedure may be employed either partially or completely to purify our liquid catalyst and recover alkyl halide continuously therefrom during operation of the aforementioned hydrohalogenation process as a whole. For the sake of simplicity, the annexed drawing illustrates a mode of conducting our process in a case where but one reaction chamber is employed and where the alkyl halide formed within said reaction chamber is but slightly soluble in the catalytic solution employed. In said annexed drawing:—1 represents a packed tower which is employed as a reaction chamber; 2 represents a continuous automatic separator for separating alkyl halides from the liquid catalyst employed; 3 represents a cooling coil to aid in effecting said separation; 4 represents a catalyst reservoir to allow for fluctuations during operation of the process; 5 represents porous packing such as bricks, loose rock, etc., within 1; 6 represents a separated layer of alkyl halide; 7 represents an outlet for said alkyl halide from the system; 8 represents separated liquid catalyst ready for return to the reaction chamber; 9 represents an inlet for gaseous olefines; 10 represents an inlet for hydrogen halide; 11 represents an outlet for unreacted olefines and 12 represents a pump for circulating the liquid catalyst through the system as diagrammed. In operating with apparatus arranged in the manner illustrated by said drawing, a stream of a hydrogen halide and olefinic gas mixture is passed upwardly through a downwardly flowing spray or current of liquid catalyst maintained at any desired temperature. Alkyl halides formed during said operation are swept downward with the liquid catalyst and removed from the system by means of the automatic separator, 2. Unreacted hydrogen halide and olefines pass from the reaction chamber through the outlet, 11, and may be further combined by subsequent passage through a similar reaction chamber wherein is employed a liquid catalyst of greater activity than that of the catalyst employed in the system just described.

A modification of the above described mode of procedure, and one particularly applicable when the liquid catalyst employed in a series of reactors contains but a single active ingredient dissolved (in varying concentrations) in a concentrated hydrohalogen acid, and even more particularly applicable when the alkyl halide formed within the various reaction chambers is appreciably soluble in the aforementioned liquid catalyst, is to dilute the most concentrated liquid catalyst with water or hydrohalogen acid, as it emerges from a reaction chamber, so as to form a separate layer of the alkyl halides dissolved in said catalyst, pass the resulting mixture into an automatic separator, separate the layer of alkyl halides, decant or filter any polymerized olefines from the diluted catalyst, and pass the diluted liquid catalyst into another of the series of reaction chambers wherein it may be re-employed as a catalyst possessing a lower degree of activity than that possessed by the catalyst as it passed through the first mentioned reaction chamber before being diluted. After the catalyst has passed, in such manner, through an entire series of reactors, it may be reconcentrated with very little loss, by evaporation, and be re-employed in the system.

The mode of operation last described is limited in applicability by two factors:—A small quantity of alkyl halide is swept from one reaction chamber to the next by the catalyst itself, so that the purity of an alkyl halide separated from a given reaction chamber is reduced somewhat by the transfer of contaminating dissimilar halide, with the catalyst, from one reaction chamber to another, and it is not practicable to use any catalyst solvent other than a hydrohalogen acid when such mode of operation is employed. A mode of operation which may be applied more generally than may either of those described above is to distill the alkyl halides from a liquid catalyst as the latter leaves a reaction chamber, decant or filter the catalyst, if necessary, so as to remove polymerized olefines therefrom, add sufficient catalyst solvent to replace that lost through said distillation, and return the catalyst to the above mentioned reaction chamber for re-employment. By operation according to the last described mode of procedure, any solvent capable of dissolving the active ingredients of the catalyst used, and having a boiling point different and preferably greater than that of the alkyl halides formed within said catalyst during operation of the process as a whole, may be employed as a catalyst diluent. The last mentioned mode of procedure is further advantageous in that there is no migration of the liquid catalyst from one reaction chamber to the next, hence no intermixing of products through the agency of the catalyst itself, and in that different types of catalyst may be employed in the different members of a series of reaction chambers (e. g. bismuth trichloride may be employed in one chamber and antimony trichloride in another).

Another mode of operation which may be employed to effect a separation of alkyl halides from our liquid catalysts, and at the same time to purify the catalyst itself, is to add sufficient water to the liquid catalyst, after it leaves the reaction chamber, so that a separate layer of alkyl halides and a precipitate of the oxyhalide of the metal employed in said catalyst, is formed; separate then the alkyl halide layer, filter off the metal oxyhalide, add to the latter sufficient hydrohalogen acid to cause complete solution, and re-employ the resultant solution as a liquid catalyst.

When it becomes desirable to purify a catalyst completely, such purification may be effected through fractional distillation of the same, either under atmospheric or sub-atmospheric pressure. During such distillation, a small quantity of metal oxyhalide is usually formed. This material may be recovered by treating the residue from said distillation with hydrohalogen acid and continuing the distillation operation.

The following examples illustrate several of the many modes of employing the principle of our invention and are not to be construed as a limitation on said invention.

Example 1

To an olefinic, gaseous mixture, obtained through cracking kerosene, was added hydrogen chloride in about 5 per cent excess over the quantity theoretically required to combine with all of the olefines present. The resultant gaseous mixture was passed, at a rate of 12 liters per hour and during a 10 hour period, through a series of 4 glass reaction towers, each such tower being of 1 inch interior diameter by 18 inch length, each tower being arranged in a vertical position with its base resting, approximately, on a horizontal plane with all other of the series of towers, each tower having a 500 cubic centimeter expansion chamber at its upper extremity, each tower being filled with glass beads and a liquid catalyst, and the reaction system as a whole being arranged so that the gaseous mixture was passed upward through the liquid catalysts in each of the successive towers. The first 2 of the series of towers through which the gaseous mixture passed were filled with 65 and 90 per cent solutions of antimony trichloride in concentrated hydrochloric acid, respectively, and the reaction mixture within each tower was maintained at approximately 25° C. during operation. The last 2 towers were filled with pure liquid antimony trichloride and were maintained at 80° C. during operation. Condensation traps, maintained at about 0° C., were situated beyond each of the last 3 reaction towers, so that the gas ensuing, say from the second tower, would have most of the alkyl chloride which it carried with it condensed out in said trap before the gas passed into the third tower, etc.

After gases had been passed through the above described reaction system for a period of 10 hours, it was found that the towers which had been maintained at 25° C. contained a lower layer of liquid catalyst and an upper layer of alkyl chloride. The 2 layers were separated, the catalyst layer was heated to about 150° C. so as to distill all alkyl chloride therefrom and the distillate was combined with the above mentioned alkyl chloride layer. Alkyl chlorides which were condensed in a given condensation trap were combined with the alkyl chlorides separated from the contents of the tower just preceding said trap. The alkyl chloride mixture, obtained in such manner from each tower and its accompanying condensation trap, was fractionally distilled so as to separate the various alkyl chlorides. From the first tower (in which a 65 per cent solution of antimony trichloride had been employed) there were obtained 7 grams of amyl chloride and 9 grams of butyl chloride; from the second tower and its condensation trap, there were obtained 4 grams of amyl chloride, 41 grams of butyl chloride, and 121 grams of propyl chloride; from the third tower and trap there was obtained 3 grams of nearly pure propyl chloride; and no alkyl chlorides were found, either in the contents of the fourth tower or in the accompanying trap.

The gases which passed through the reaction system were passed into liquid bromine until a colorless liquid was formed. This liquid was dried over anhydrous lime and then heated to about 100° C. so as to distill off all traces of unchanged ethylene and propyl chloride which might be present. The liquid remaining after such treatment was found to have the physical constants:—index of refraction at 20° C., 1.5363; specific gravity at 20° C. with respect to water at the same temperature, 2.17; boiling point at atmospheric pressure, 130° C.; and freezing point, 9.5° C. The brominated product, then, was ethylene bromide of excellent quality. In purifying said ethylene bromide, no steps were employed which would tend to remove higher olefine bromides therefrom. Hence, it follows that the gaseous mixture which passed through the reaction system as uncondensed material, contained ethylene in a form substantially free of contamination by homologous compounds.

Example 2

An olefine-containing gaseous mixture, obtained through cracking hydrocarbon oils, was mixed with about a 5 per cent excess of hydrogen chloride over the quantity of the latter compound theoretically required in order to combine with all of the olefines present. The resultant gaseous mixture was passed, at a rate of 16.8 liters per hour and during a 29 hour period, through a reaction system similar to that described in Example 1, except that the consecutive towers, through which the reaction mixture passed, were filled with 45, 75, 90, and 95 per cent solutions, respectively, of antimony trichloride in concentrated hydrochloric acid, and said towers were maintained at the temperatures, 25°, 25°, 25°, and 55° C., respectively, during operation. The alkyl chloride products formed in each tower were separated and isolated through procedure similar to that described in Example 1. From the first tower there was obtained 2 grams of nearly pure amyl chloride; from the second tower and its accompanying condensation trap there were obtained 12 grams of amyl chloride, 21 grams of butyl chloride, and 8 grams of propyl chloride; from the third tower and its trap, 5 grams of amyl chloride, 19 grams of butyl chloride and 8 grams of propyl chloride were recovered; and from the fourth tower and its trap there were obtained 21 grams of butyl chloride and 15 grams of propyl chloride. The purity of the ethylene in the gaseous mixture, which passed through the reaction system without being condensed, was tested by forming ethylene bromide therefrom and determining the physical constants of the latter, the procedure involved being similar to that described in Example 1. The purified ethylene was found to be practically free of contamination by homologous compounds.

Example 3

Three tests were made, each by passing a gaseous mixture, consisting of ethylene and about 5 per cent more than its chemical equivalent of hydrogen chloride, through a single reaction tower at a rate of 9 liters per hour, said reaction tower being similar in dimensions to the towers described in Example 1, and being filled with glass beads and a liquid catalyst. Ethyl chloride was collected in a series of two condensation traps, the first of which traps was cooled with a salt-ice mixture and the second of which was cooled with a carbon dioxide, acetone solution. All ethyl chloride collected from a given run was purified through fractional distillation thereof. When pure antimony trichloride was employed as a catalyst at the temperature 145° C., approximately 7 per cent of the ethylene used was converted to ethyl chloride. When a liquid catalyst, 34 per cent, by weight, of which was antimony trichloride, 6 per cent glacial acetic acid, and 60 per cent bismuth trichloride, was employed at the temperature, 150° C., approximately 37 per cent of the ethylene used was converted to ethyl chloride. When a liquid, consisting of 15 per cent, by weight, glacial acetic acid, and 85 per cent bismuth trichloride, was employed as a catalyst at the temperature, 155° C., only 7 per cent of the ethylene used was converted to ethyl chloride.

Example 4

Two tests were made, each by passing a gaseous mixture, consisting of propylene and about 5 per cent more than its chemical equivalent of hydrogen chloride, through a single reaction tower at a rate of 15 liters per hour, said reaction tower being similar in dimensions to the towers described in Example 1 and being filled with glass beads and a liquid catalyst. The conversion of propylene to propyl chloride was measured by determining the quantity of propylene which passed through the catalyst unreacted. When a liquid, consisting of 10 per cent, by weight, glacial acetic acid and 90 per cent antimony trichloride, was employed, at the temperature 70° C., as a catalyst in the above described manner, less than 4 per cent of the propylene which was passed into said catalyst passed through the same unreacted. When a liquid, consisting of 10 per cent acetophenone, by weight, and 90 per cent antimony trichloride was employed as a catalyst under similar conditions, less than 6 per cent of the propylene which was passed into the catalyst passed through the same unreacted.

Example 5

A gaseous mixture, consisting of propylene and about 5 per cent more than its chemical equivalent of hydrogen bromide, was passed, at the rate of 15 liters per hour, through a reaction tower similar in dimensions to the towers described in Example 1, said tower being filled with glass beads and with a liquid catalyst consisting of 10 per cent, by weight, concentrated hydrochloric acid and 90 per cent antimony tribromide. The catalyst was maintained at the temperature, 70° C., during passage of the gas. Through procedure similar to that described in Example 1, approximately 21 per cent of propylene employed was recovered essentially as propyl bromide.

Example 6

A gaseous mixture, consisting of propylene and about 5 per cent more than its chemical equivalent of hydrogen chloride, was passed at a rate of 15 liters per hour through a reaction tower, similar in dimensions to the towers described in Examples 1, said tower being filled with glass beads and with a liquid catalyst consisting of 10 per cent, by weight, concentrated hydrochloric acid and 90 per cent, by weight, antimony tribromide. The catalyst was maintained at the temperature, 70° C., during passage of the gas and the reaction products were isolated through procedure similar to that described in Example 1. Approximately 24 per cent of the propylene used was converted to propyl chloride. The antimony tribromide in the liquid catalyst was not converted, appreciably, to antimony trichloride during the reaction period.

Example 7

Gaseous hydrogen chloride and liquid cyclohexene were passed at the rates of 15 liters per hour and 60 cubic centimeters per hour, respectively, and during a two hour period, into a liquid catalyst consisting of 95 per cent, by weight, antimony trichloride and 5 per cent concentrated hydrochloric acid, said catalyst being contained in a tower similar in dimensions to the towers described in Example 1 and being maintained at the temperature, 76° C., during operation. A total of 78.6 grams of cyclohexene and approximately its chemical equivalent of gaseous hydrogen chloride was employed during the above described operation. At the end of the period mentioned, the reaction mixture (which included the catalyst) was treated with sufficient dilute hydrochloric acid to cause the formation of a separate layer comprising cyclohexyl-chloride. The cyclohexyl-chloride layer was steam distilled and from the distillate there was separated 70 grams of substantially pure cyclohexyl-chloride.

In Examples 1 and 2, it will be noted that the alkyl chloride mixture separated from a given liquid catalyst and its accompanying condensation trap contained, in all cases, more than 50 per cent, by weight, of a single compound. The tests described in Examples 1 and 2 were made with laboratory apparatus and the conditions employed were not optimum, hence, the results described in said examples are to be considered as an indication of the possibilities of the present process, not as the most efficient selective hydrohalogenation of mixed olefines and separation of reaction products obtainable through employing the same.

In Example 3, are described several tests which were made to determine the action of various liquid catalysts on a mixture of ethylene and hydrogen chloride. While said tests are not entirely comparative, yet the results obtained are so pronounced as to show clearly that a liquid catalyst, containing the trichlorides of both antimony and bismuth, is more active when employed to promote the conversion of ethylene to ethyl chloride than is a liquid catalyst containing the trichloride of but one of the metals mentioned.

Example 4 illustrates the feasibility of employing an organic solvent as a catalyst medium.

Examples 5 and 6 illustrate the fact that a liquid catalyst, containing antimony tribromide, may be employed to promote either the hydrochlorination or hydrobromination of an olefine. It will be particularly noted, in Example 6, that where antimony tribromide is employed to promote the addition of hydrogen chloride to an olefine, the antimony tribromide itself remains substantially unchanged. The tribromides of metals belonging to the fifth group of the periodic system are less active as catalysts in our process than are the corresponding trichlorides. Hence, said metal tribromides are particularly useful for employment as catalysts for the conversion of the more reactive olefines to alkyl halides. In the presence of a highly active catalyst said more reactive olefines tend to polymerize to some extent. However, as the activity of the catalyst is reduced the tendency toward polymerization is reduced materially.

Example 7, illustrates the fact that the present invention is not restricted to the employment of gaseous, straight chain olefines as olefinic reactants. A liquid, cyclic olefine may also be hydrohalogenated, in the presence of our improved catalyst, to form the corresponding alicyclic-halide. The higher straight chain olefines may likewise be converted to alkyl halides through treatment with hydrogen halide in the presence of an improved catalyst, of the type herein described, under proper reaction conditions.

The principle of our invention may be employed in ways other than those described in the examples. The reactions involved in our process may, for instance, be carried out under sub-atmospheric, atmospheric, or super-atmospheric pressure. The condensation of a gaseous olefine with a gaseous hydrogen halide results in a reduction of the total volume of the reaction mixture. An increase in the pressure under which such reaction is carried out, therefore, both increases the speed of reaction and drives the reaction toward completion.

Again, though the examples which describe the formation of alkyl halides from a mixture of olefines are limited to the case where mixed gaseous olefines and more than their combined chemical equivalent of hydrogen halide are simultaneously passed through a series of liquid catalysts, we may operate so as to have less hydrogen halide present, for example, just sufficient hydrogen halide present to combine with the most reactive of the mixed olefines when the reaction mixture passes through a given member of the series of liquid catalysts. When operating according to the procedure just described, hydrogen halide is added, at desired intervals and in the quantities required, to the reaction mixture during passage of the same through the reaction system. The mode of operation just described is advantageous in that it reduces the tendency of the mixed olefines to react to form a mixture of alkyl halides within a given liquid catalyst.

The above mentioned examples, again are limited to a mode of operation whereby a mixture, consisting of olefines and hydrogen halide, is passed through a series of liquid catalysts. The olefines and hydrogen halides may, however, be added separately to the liquid catalyst and may be brought into contact with one another and said catalyst, and, in fact, the hydrogen halide, employed as a reactant, may be added to the liquid catalyst in the form of a concentrated, aqueous solution thereof.

Our process is not limited to the employment of hydrogen chloride and hydrogen bromide as hydrogen halide reactants. Hydrogen iodide may also be employed successfully as a reactant in our process. Furthermore, the active ingredient employed within the liquid catalyst may be any compound of a metal belonging to the fifth group of the periodic system which is capable of dissolving in the catalyst medium employed. When compounds (such as acetates, oxalates, etc.) other than the halides of such metals are so employed, they are, of course, partially converted to the metal halides during operation of the process as a whole.

We find that organic solvents may be employed as catalyst mediums with actual advantage, both in that the reaction proceeds more smoothly and in that the alkyl halide products formed within a given reaction chamber tend to remain dissolved in the liquid catalyst, hence, the tendency of alkyl halides, formed within the various members of a series of reaction chambers, to become intermixed is reduced materially. We find it particularly advantageous to employ an organic solvent (e. g. acetic acid, mono-chloro-benzene, etc.) as the catalyst medium in the last member of a series of liquid catalysts through which a reaction mixture is passed. Complete conversion of propylene to an isopropyl halide is attained more readily in the presence of a liquid catalyst comprising an organic solvent as catalyst medium than in the presence of a similar catalyst comprising a hydrohalogen acid as medium.

One skilled in the art will understand that where both the speed and completeness of reaction between a hydrogen halide and each olefine present in a mixture of gaseous olefines may be varied through a change in any one of the many variable conditions (such as catalytic compound employed, concentration of liquid catalyst, catalyst solvent employed, temperature at which the reaction is conducted, pressure under which the reaction is carried out, rate of gas flow, etc.) under which the reaction is conducted, it is totally impossible to set forth a complete range of conditions under which the process may be operated. For instance, one may carry the reactions out at a relatively low temperature by increasing the pressure under which the reactions are conducted. It may be stated, however, that when a gaseous mixture consisting of propylene and about 5 per cent more than its chemical equivalent of hydrogen chloride is passed, under atmospheric pressure and at the rate of 250 cubic centimeters per minute, through a reaction tower (of 1 inch interior diameter and 18 inch length) filled with a catalyst solution, composed of 90 per cent antimony trichloride and 10 per cent concentrated hydrochloric acid, about 47 per cent of the propylene is converted to isopropyl chloride at 25° C., about 65 per cent of the propylene reacts at 80° C., and the conversion is nearly quantitative at 95° C. When a similar gaseous mixture consisting of propylene and hydrogen chloride is passed, at the above stated rate, under atmospheric pressure and at the temperature 76° C., in like apparatus through a liquid catalyst, 75 per cent of which is antimony trichloride and 25 per cent of which is concentrated hydrochloric acid, the reaction scarcely proceeds at all; when, however, a liquid catalyst, consisting of 95 per cent antimony trichloride and 5 per cent concentrated hydrochloric acid, is employed in similar manner, approximately 73 per cent of the propylene is converted to isopropyl chloride. Only a trace of ethyl chloride is formed when a mixture of ethylene and 5 per cent more than its chemical equivalent of hydrogen chloride are passed, at a rate of 150 cubic centimeters per minute and at the temperature, 125° C., through the previously described reaction tower filled with pure liquid antimony trichloride. The gaseous olefines, then, become more reactive with an increase in molecular weight. We prefer, in all cases, to operate at temperatures below 250° C.

Our invention is not restricted with respect to the number of reaction chambers which may be employed in separating ethylene from its homologues. While it is usually advantageous to pass the gaseous reaction mixture through a series of reaction chambers filled with liquid catalysts of successively increasing activity, ethylene may be separated from homologous compounds by passing the reaction mixture through a single liquid catalyst of such activity that all olefinic components of said mixture, except ethylene itself, are converted to the corresponding alkyl halides. Furthermore, our invention is not restricted to the employment of a single compound of a metal of the fifth group of the periodic system as the active ingredient in a given liquid catalyst. When employing the halides of such metals as catalysts, for instance, it is frequently advantageous to use a mixture of antimony and bismuth halides in order to obtain a highly concentrated catalyst of sufficiently low freezing point so that said catalyst may be employed in liquid form at a relatively low temperature. In some instances we have observed mixtures of antimony and bismuth trichlorides to possess greater activity under given reaction conditions than do either of the components of said mixture when employed alone under similar reaction conditions. In this connection, it might be mentioned that we find our liquid catalysts to have a great tendency to supercool, so that we are often enabled to employ such catalysts in our process at temperatures considerably below their freezing points.

When ethylene is separated from other olefines by means of our process the ethylene, so obtained, may further be separated from alkyl halides and other non-olefinic impurities by any suitable means, e. g. by fractional condensation, by scrubbing with an organic solvent of low volatility such as ortho-dichloro-benzene, by compression to a liquid and fractional distillation of the latter, etc.

Our invention, in general comprises an improved method for preparing an alkyl halide through reacting an olefine with hydrogen halide in the presence of a liquid catalyst which contains a compound of a metal belonging to the fifth group of the periodic system, and said invention more particularly concerns a method for reacting various members of a gaseous olefinic mixture with hydrogen halide in the presence of such liquid catalyst (or series of catalysts) so as to selectively, and substantially separately, form alkyl halides from the more reactive olefine or olefines present and leave the less reactive olefine or olefines substantially unreacted, whereby each alkyl halide so formed may be separated, largely as a single compound, the less reactive member of the olefinic mixture may be separated in a form substantially free of contamination by homologous compounds or may, in turn, be converted to the corresponding alkyl halide and separated as such, and the aforedescribed liquid catalyst or catalysts, employed in effecting such ends, may be purified continuously during operation of the process as a whole.

In practicing our invention we may treat a mixture of pure olefines according to procedure previously described herein, but we find it advantageous, in many cases, to intermix with the olefinic reactants, a non-reactive gaseous diluent such as air, nitrogen, etc. Such dilution of the gaseous reactants reduces, somewhat, the tendency of the more reactive olefines to polymerize.

Other modes of applying the principle of our invention may be employed instead of those explained, change being made as regards the method herein disclosed, provided the step or steps stated by any of the following claims or the equivalent of such stated step or steps be employed.

We therefore particularly point out and distinctly claim as our invention:—

1. A method for making an alkyl halide which comprises reacting an olefine with a hydrogen halide in the presence of a liquid catalyst, the catalytically active ingredient of which consists essentially of at least one compound of at least one metal belonging to the fifth group of the periodic system.

2. A method for making an alkyl halide which comprises reacting an olefine with a hydrogen halide in the presence of a liquid catalyst, the catalytically active ingredient of which consists essentially of at least one halide of at least one metal belonging to the fifth group of the periodic system.

3. A method for making an alkyl halide which comprises reacting an olefine with a hydrogen halide in the presence of a liquid catalyst, the catalytically active ingredients of which consists essentially of antimony trihalide and bismuth trihalide.

4. A method for making an alkyl chloride which comprises reacting an olefine with hydrogen chloride in the presence of a liquid catalyst, the catalytically active ingredients of which consist essentially of antimony trichloride and bismuth trichloride.

5. In a method for making an alkyl halide, the step which consists in reacting the olefinic component of a gaseous mixture, comprising an olefine and a non-reactive gaseous diluent, with hydrogen halide in the presence of a liquid catalyst, the catalytically active ingredient of which consists essentially of at least one compound of at least one metal belonging to the fifth group of the periodic system.

6. A method of treating mixed gaseous olefines which comprises reacting selectively the more reactive olefines in said mixture with a hydrogen halide in the presence of a liquid catalyst, the catalytically active ingredient of which consists essentially of at least one compound of at least one metal belonging to the fifth group of the periodic system, and removing the unreacted olefines.

7. A method of treating mixed gaseous olefines which comprises reacting selectively the more reactive olefines in said mixture with a hydrogen halide in the presence of a liquid catalyst, the catalytically active ingredient of which consists essentially of at least one halide of at least one metal belonging to the fifth group of the periodic system, and removing the unreacted olefines.

8. A method of treating mixed gaseous olefines which comprises reacting selectively the more reactive olefines with a hydrogen halide in the presence of a liquid catalyst, the catalytically active ingredient of which consists essentially of a bismuth trihalide, and removing the unreacted olefines.

9. A method of treating mixed gaseous olefines which comprises reacting selectively the more reactive olefines with a hydrogen halide in the presence of a liquid catalyst, the catalytically active ingredient of which consists essentially of an antimony trihalide, and removing the unreacted olefines.

10. A method for separating ethylene from its homologues which comprises reacting said homologues of ethylene with a hydrogen halide in the presence of a liquid catalyst, the catalytically active ingredient of which consists essentially of at least one compound of at least one metal belonging to the fifth group of the periodic system, and separating ethylene from the reaction mixture.

11. A method for separating ethylene from its homologues which comprises reacting selectively, said homologues of ethylene with a hydrogen halide in the presence of a liquid catalyst, the catalytically active ingredient of which consists essentially of at least one halide of at least one metal belonging to the fifth group of the periodic system, and removing ethylene from the reaction mixture.

12. In a method for separating ethylene from its homologues, the steps which consist in reacting components of a gaseous mixture, comprising ethylene, homologues of ethylene and a non-reactive gaseous diluent, with hydrogen halide, successively in the presence of each of a series of liquid catalysts of successively increasing activities, the catalytically active ingredients of said liquid catalysts consisting essentially of compounds of metals belonging to the fifth group of the periodic system, so as selectively, and substantially separately, to convert all olefines except ethylene to their corresponding alkyl halides, and in separating the mixture of ethylene and the non-reactive gaseous diluent from the reaction mixture.

13. In a method of treating mixed gaseous olefines, the steps which consist in passing a gaseous mixture containing said olefines and a hydrogen halide through a series of liquid catalysts of successively increasing activities, the catalytically active ingredient of each liquid catalyst consisting essentially of at least one compound of at least one metal belonging to the fifth group of the periodic system, whereby various olefinic components of said gaseous reaction mixture are converted, selectively, to the corresponding alkyl halides in the order of their decreasing relative reactivities, separating each alkyl halide from the reaction mixture, and purifying the various liquid catalysts.

14. In a method of treating mixed gaseous olefines, the steps which consist in passing a gaseous mixture containing said olefines and a hydrogen halide through a series of liquid catalysts of successively increasing activities, the catalytically active ingredient of each liquid catalyst consisting essentially of at least one halide of at least one metal belonging to the fifth group of the periodic system, whereby various olefinic components of said gaseous reaction mixture are converted, selectively and substantially separately, to the corresponding alkyl halides in the order of their decreasing relative reactivities, separating each alkyl halide from the reaction mixture and purifying the liquid catalysts, by removing alkyl halides therefrom.

15. In a method of treating mixed gaseous olefines, the steps which consist in passing a gaseous mixture containing said olefines and more than their combined chemical equivalent of a hydrogen halide through a series of liquid catalysts of successively increasing activities, the catalytically active ingredient of each liquid catalyst consisting essentially of at least one halide of at least one metal belonging to the fifth group of the periodic system, whereby various olefinic components of said gaseous reaction mixture are, in the order of their decreasing relative reactivities, selectively and substantially separately converted to the corresponding alkyl halides, separating each alkyl halide from the reaction mixture, and continuously purifying the liquid catalysts, by removing alkyl halides therefrom.

16. In a method of treating mixed gaseous olefines, the steps which consist in passing a gaseous mixture containing said olefines and sufficient hydrogen halide to combine with the most reactive olefine present in said mixture through a liquid catalyst, the catalytically active ingredient of which consists essentially of at least one halide of at least one metal of the fifth group of the periodic system, said catalyst being capable of promoting addition of hydrogen halide to the most active olefine present, separating the resultant alkyl halide from the reaction mixture substantially as it is formed, introducing into the gaseous reaction mixture that quantity of hydrogen halide required to combine with the most reactive olefine remaining in the reaction mixture, passing the gaseous mixture through a second liquid catalyst, the catalytically active ingredient of which consists essentially of at least one halide of at least one metal of the fifth group of the periodic system, said catalyst being sufficiently active to promote the addition of hydrogen halide to the above mentioned most active olefine, separating the alkyl halide from the reaction mixture and continuing the above described mode of operation until the removal of the most reactive olefines from the olefinic mixture has been carried to any point desired.

17. In a method of treating mixed gaseous olefines, the steps which consist in passing a gaseous mixture, containing said olefines, a hydrogen halide, and a non-reactive gaseous diluent, through a series of liquid catalysts of successively increasing activities, the catalytically active ingredient of each liquid catalyst consisting essentially of at least one compound of at least one metal belonging to the fifth group of the periodic system, whereby various olefinic components of said gaseous reaction mixture are converted, selectively and substantially separately, to the corresponding alkyl halides in the order of their decreasing relative reactivities, separating each alkyl halide from the reaction mixture substantially as it is formed, and continuously purifying the various liquid catalysts, by removing alkyl halides therefrom, during operation of the process as a whole.

18. In a method of treating mixed olefines, the step which consists in continuously purifying a liquid catalyst, consisting of a halide of a metal belonging to the fifth group of the periodic system and a concentrated hydrohalogen acid, by continuously circulating said catalyst, first through a reaction chamber where it is employed to promote the addition of a hydrogen halide to an olefine, then through a dilution chamber where sufficient water is added to the liquid catalyst so that the alkyl halides which may be dissolved therein separate as a distinct layer, then through a continuously operating separator where alkyl halides are removed from the diluted catalyst, then through an evaporator where the catalyst is reconcentrated, and finally back into the reaction chamber where the catalyst is again used to promote the addition of a hydrogen halide to an olefine.

19. In a method of treating mixed olefines, the step which consists in purifying, continuously a liquid catalyst, the catalytically active ingredient of which consists essentially of at least one halide of at least one metal belonging to the fifth group of the periodic system, by circulating said catalyst, first through a reaction chamber wherein said catalyst is used to promote the addition of a hydrogen halide to an olefine, and thereafter through a continuously operating still wherein alkyl halides are distilled from the liquid catalyst, and finally back into a reaction chamber where the catalyst is again used to promote the addition of hydrogen halide to an olefine.

20. As an improved catalyst, for the addition of hydrogen halide to an olefine, an aqueous, concentrated hydrogen halide solution, having dissolved therein a halide of a metal belonging to the fifth group of the periodic system.

21. In a process whereby hydrogen halide is reacted with an olefine, in the presence of a liquid catalyst, the catalytically active ingredient of which consists essentially of at least one compound of at least one metal belonging to the fifth group of the periodic system, to form an alkyl halide, the method of controlling the rate of reaction between the aforementioned reactants, which comprises controlling the concentration of the active ingredient present in the above mentioned liquid catalyst and the temperature at which said liquid catalyst is employed.

22. In a method of treating mixed gaseous olefines, the steps which consist in passing a gaseous mixture containing said olefines and a hydrogen halide through a series of liquid catalysts of successively increasing activities, the less active of which liquid catalysts contains at least one halide of at least one metal belonging to the fifth series of the periodic system as the essential catalytically active ingredient and an aqueous, concentrated hydrohalogen acid, and the more active of which liquid catalysts contains at least one halide of at least one metal belonging to the fifth group of the periodic system as the essential catalytically active ingredient and an organic solvent capable of dissolving the same, whereby various olefinic components of said gaseous reaction mixture are converted, selectively, to the corresponding alkyl halides in the order of their decreasing relative reactivities, and separating each alkyl halide from the reaction mixture substantially as it is formed.

23. In a method of treating mixed gaseous olefines so as to convert the more reactive olefines to the corresponding alkyl halides through reacting said more reactive olefines with a hydrogen halide in the presence of a liquid catalyst containing a halide of a metal belonging to the fifth group of the periodic system, the step which consists in cooling the gaseous reaction mixture, after it is withdrawn from such liquid catalyst, so as to condense, and thereby separate, alkyl halides from the same.

24. A method of treating mixed gaseous olefines which comprises reacting selectively the more reactive olefines in said mixture with hydrogen chloride in the presence of a liquid catalyst, the catalytically active ingredient of which consists essentially of at least one chloride of at least one metal belonging to the fifth group of the periodic system, and removing the unreacted olefines.

25. A method of treating mixed gaseous olefines which comprises reacting selectively the more reactive olefines with hydrogen chloride in the presence of a liquid catalyst, the catalytically active ingredient of which consists essentially of bismuth trichloride, and removing the unreacted olefines.

26. A method of treating mixed gaseous olefines which comprises reacting selectively the more reactive olefines with hydrogen chloride in the presence of a liquid catalyst, the catalytically active ingredient of which consists essentially of antimony trichloride, and removing the unreacted olefines.

27. A method for separating ethylene from its homologues which comprises reacting selectively said homologues of ethylene with hydrogen chloride in the presence of a liquid catalyst, the catalytically active ingredient of which consists essentially of at least one chloride of at least one metal belonging to the fifth group of the periodic system, and removing ethylene from the reaction mixture.

28. A method for separating ethylene from its homologues which comprises reacting selectively said homologues of ethylene with a hydrogen halide in the presence of a liquid catalyst, the catalytically active ingredient of which consists essentially of a bismuth trihalide, and removing ethylene from the reaction mixture.

29. A method for separating ethylene from its homologues which comprises reacting selectively said homologues of ethylene with a hydrogen halide in the presence of a liquid catalyst, the catalytically active ingredient of which consists essentially of an antimony trihalide, and removing ethylene from the reaction mixture.

30. A method for separating ethylene from its homologues which comprises reacting selectively said homologues of ethylene with hydrogen chloride in the presence of a liquid catalyst, the catalytically active ingredient of which consists essentially of bismuth trichloride, and removing ethylene from the reaction mixture.

31. A method for separating ethylene from its homologues which comprises reacting selectively said homologues of ethylene with hydrogen chloride in the presence of a liquid catalyst, the catalytically active ingredient of which consists essentially of antimony trichloride, and removing ethylene from the reaction mixture.

32. In a method of treating mixed gaseous olefines, the steps which consist in passing a gaseous mixture containing said olefines and hydrogen chloride through a series of liquid catalysts of successively increasing activities, the catalytically active ingredient of each liquid catalyst consisting essentially of at least one chloride of at least one metal belonging to the fifth group of the periodic system, whereby various olefinic components of said gaseous reaction mixture are converted selectively and substantially separately to the corresponding alkyl chlorides in the order of their decreasing reactivities, separating each alkyl chloride from the reaction mixture and purifying the liquid catalysts by removing alkyl chlorides therefrom.

HOWARD S. NUTTING.
PETER S. PETRIE.
DONALD H. CROOPE.
MYRON E. HUSCHER.